(12) United States Patent
Gibson et al.

(10) Patent No.: US 10,353,909 B2
(45) Date of Patent: Jul. 16, 2019

(54) SYSTEM AND METHOD FOR VISUALIZING DATA

(71) Applicant: International Business Machines Corporation, Armonk, NY (US)

(72) Inventors: Stephen D. Gibson, Ottawa (CA); Mohammed Mostafa, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/005,344

(22) Filed: Jan. 25, 2016

(65) Prior Publication Data

US 2017/0212941 A1 Jul. 27, 2017

(51) Int. Cl.
*G06F 17/30* (2006.01)
*G06F 16/248* (2019.01)

(52) U.S. Cl.
CPC .................................. *G06F 16/248* (2019.01)

(58) Field of Classification Search
None
See application file for complete search history.

(56) References Cited

U.S. PATENT DOCUMENTS

| | | | | |
|---|---|---|---|---|
| 7,840,600 | B1* | 11/2010 | Bhatia | G06F 17/30398 707/783 |
| 2006/0277476 | A1* | 12/2006 | Lai | G06F 17/243 715/760 |
| 2008/0065634 | A1* | 3/2008 | Krinsky | G06F 17/30867 |
| 2012/0313949 | A1* | 12/2012 | Rope | G06T 11/206 345/440 |
| 2013/0097177 | A1* | 4/2013 | Fan | G06F 17/30554 707/748 |
| 2013/0176315 | A1 | 7/2013 | Winkle et al. | |
| 2014/0040805 | A1 | 2/2014 | Brereton et al. | |
| 2014/0330821 | A1 | 11/2014 | Tullis et al. | |

* cited by examiner

*Primary Examiner* — Alex Gofman
(74) *Attorney, Agent, or Firm* — Shumaker & Sieffert, P.A.

(57) ABSTRACT

Techniques are described for selecting, based on a data visualization intent specification and a defined set of data fields associated with a set of data, two or more Meta templates that meet the data visualization intent specification and that support the set of data fields, for determining chart parts that can be used within the selected Meta templates to form chart templates and for determining, based on a set of combination rules and the specification, the chart templates that meet the data visualization intent specification.

20 Claims, 8 Drawing Sheets

| YEAR | PRODUCT | REVENUE |
|------|---------|---------|
| 2013 | CAR | 1000 |
| 2013 | TRUCK | 2000 |
| 2013 | VAN | 1500 |
| 2014 | CAR | 1500 |
| 2014 | TRUCK | 1500 |
| 2014 | VAN | 2000 |
| 2015 | CAR | 3000 |
| 2015 | TRUCK | 1000 |
| 2015 | VAN | 2000 |

| YEAR | PRODUCT | REVENUE | COST |
|---|---|---|---|
| 2013 | CAR | 1000 | 500 |
| 2013 | TRUCK | 2000 | 800 |
| 2013 | VAN | 1500 | 900 |
| 2014 | CAR | 1500 | 600 |
| 2014 | TRUCK | 1500 | 750 |
| 2014 | VAN | 2000 | 950 |
| 2015 | CAR | 3000 | 650 |
| 2015 | TRUCK | 1000 | 700 |
| 2015 | VAN | 2000 | 1000 |

SYSTEM AND METHOD FOR VISUALIZING DATA

TECHNICAL FIELD

This disclosure relates to visualization of data.

BACKGROUND

Visualizations have incredible power to convey patterns and insights within a user's data, so much so that simply choosing an appropriate visualization for the user and the user's goal will often get them quickly to the insight they are trying to find. Choosing a less ideal visualization for the user's current data and goal will rarely lead to an appropriate insight, making the analysis experience far less enjoyable and fruitful. Quite often a novice user does not typically have a good grasp on what visualization will help them solve the problem they are trying to solve, making it very difficult for them to get to insights quickly.

SUMMARY

In one aspect of the invention, a method includes selecting, based on a data visualization intent specification and a defined set of data fields associated with a set of data, two or more Meta templates that meet the data visualization intent specification and that support the set of data fields. The method further includes determining chart parts that can be used within the selected Meta templates to form chart templates. The method further includes determining, based on a set of combination rules and the specification, the chart templates that meet the data visualization intent specification.

In another aspect of the invention, a computer program product includes a computer-readable storage medium having program code embodied therewith, the program code executable by a computing device to select, based on a data visualization intent specification and a defined set of data fields associated with a set of data, two or more Meta templates that meet the data visualization intent specification and that support the set of data fields. The program code is further executable to determine chart parts that can be used within the selected Meta templates to form chart templates. The program code is further executable to determine, based on a set of combination rules and the specification, the chart templates that meet the data visualization intent specification.

In yet another aspect of the invention, a computer system includes one or more processors, one or more computer-readable memories, one or more computer-readable storage mediums. The computer system further includes program instructions, stored on at least one of the one or more storage mediums for execution by at least one of the one or more processors via at least one of the one or more memories, to select, based on a data visualization intent specification and a defined set of data fields associated with a set of data, two or more Meta templates that meet the data visualization intent specification and that support the set of data fields. The computer system further includes program instructions, stored on at least one of the one or more storage mediums for execution by at least one of the one or more processors via at least one of the one or more memories, to determine chart parts that can be used within the selected Meta templates to form chart templates. The computer system further includes program instructions, stored on at least one of the one or more storage mediums for execution by at least one of the one or more processors via at least one of the one or more memories, to determine, based on a set of combination rules and the specification, the chart templates that meet the data visualization intent specification.

The details of one or more embodiments of the invention are set forth in the accompanying drawings and the description below. Other features, objects, and advantages of the invention will be apparent from the description and drawings, and from the claims.

DETAILED DESCRIPTION

Effective visualization of data is a broad and common problem. Because of this, data exploration and analysis tools will sometimes include visualization recommendation technologies to try and help the user get their insights faster.

Some visualization recommendation technologies use natural language as input to try and determine what the user is trying to achieve (such as Watson Analytics). Some systems look only at the data the user is currently analyzing and make guesses as to what they are trying to achieve. Both of these types of systems rely on a classification of holistic visualizations which are categorized by the purposes they serve and/or the data that they are appropriate for. Such systems can respond quickly and effectively to the user as long as the user's problem and data fit within the categories defined in the classification system. Such systems do not, however, produce high quality results when the user has a different goal. In many cases, when the user wants to gain a more complex insight into their data, their inquiry does not fit well within the categories that have already been conceived of and defined.

More sophisticated systems use advanced machine learning to train a system to produce appropriate visualizations for various scenarios. These systems are more resource intensive but can potentially result in new visualizations that can solve more complex problems than those addressed by the designers of the system. Such systems are only as good as the training they received however, which often requires a lengthy training and testing stage to ensure high quality results.

Figure 1:
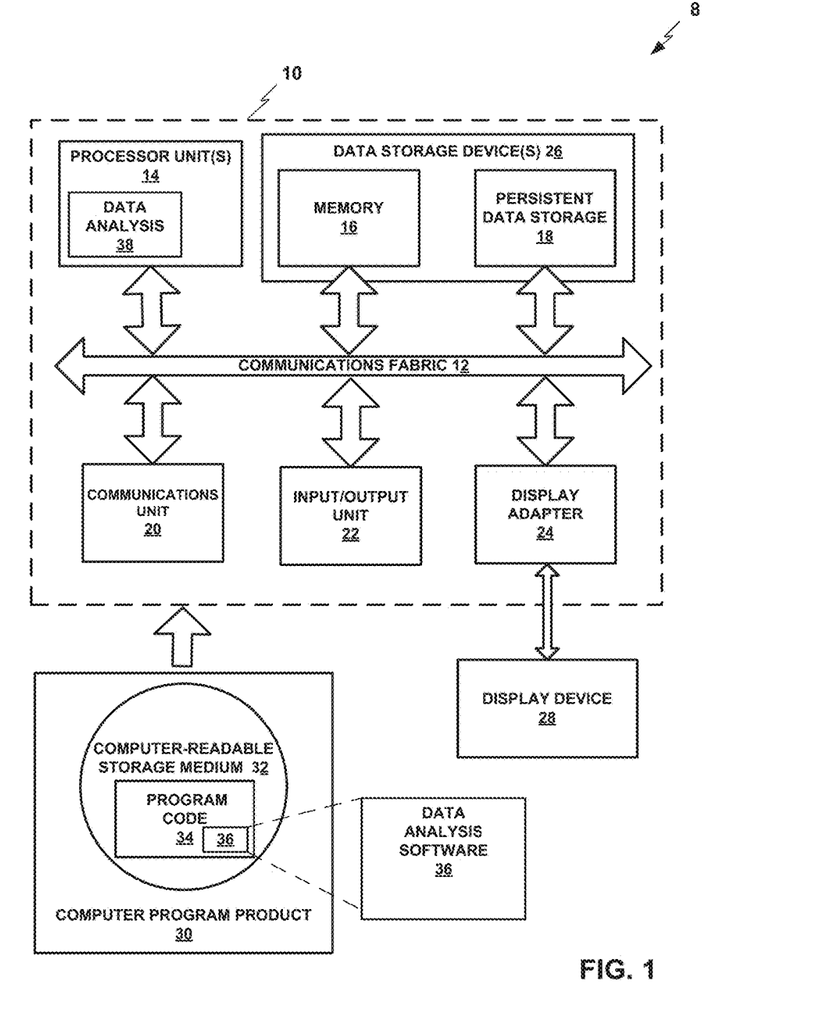
FIG. 1 is a block diagram of an example system used to make visualization recommendations, according to one aspect of this disclosure.

FIG. 1 is a block diagram of an example system used to make visualization recommendations, according to one aspect of this disclosure. Instead of basing its visualization recommendations solely on a set of wholly defined visualizations within a classification system, system 8 takes a multi stage approach to create a visualization to satisfy the user's needs from component parts. The user or integrating application provides data, and a structured description of what they would like to achieve, and system 8 puts the best visualization parts together to produce a visualization that meets the user's needs more effectively than one of the standard pre-defined types.

In one example approach, system 8 accepts two pieces of input from the user: a set of data defined in the usual way (i.e., a set of columns and individual row values), as well as a specification describing the user's data visualization intent. In one such example approach, the specification of the data visualization intent may appear as follows:

```
{
    data": {
        "fields": ["Years","Products","Revenue"],
        "data": [[...]...]
    },
    "intent" : [
        {"type": "compare", fields: ["Products","Revenue"]},
        {"type": "trend", fields: ["Years","Revenue"]}
    ]
}
```

Upon receiving this specification, system 8 processes the data to determine the type and shape of the data. The system then enumerates the set of Meta templates that can support that set of data fields. In the above example, system 8 will recommend chart templates for a data set having one continuous field and two discrete fields. As such, a Meta template for a Cartesian chart with a vertical continuous axis, a horizontal discrete axis and a discrete legend may be a good choice. (Other choices are also possible and may be enumerated such as a polar chart with a legend). Since there is no seasonality in the data, a Cartesian Meta template may likely score highest.

In one example approach, system 8 selects, based on a defined set of data fields associated with a set of data, two or more Meta templates that support the set of data fields. System 8 then determines chart parts that can be used within the selected Meta templates to form chart templates and determines, based on a set of combination rules and the specification, the chart templates that meet the data visualization intent. In one such example approach, system 8 calculates a score for each of the chart template candidates and proposes the chart template with the highest score.

One illustrative benefit of a system such as system 8 is that it is more flexible and powerful than a standard classification based recommendation systems since it can combine visualization pieces in new ways that may not have been conceived before. However, the system does not have significantly larger resource requirements, nor does it require a training period to ensure that it produces quality results. System 8 still relies on clearly defined rules to produce its outcomes, and as such can operate very quickly and predictably.

In the example approach of FIG. 1, system 8 includes a computing device 10 connected to a display device 28. Computing device 10 may be a server such as a web server or an application server. Computing device 10 may also be any computer or server that provides data exploration tools or data analysis tools, including a virtual server that may be run from or incorporate any number of computing devices 10. A computing device 10 may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 10 may include a computer having capabilities or formats other than or beyond those described herein.

In the illustrative example of FIG. 1, computing device 10 includes communications fabric 12, which provides communications between one or more processor units 14, memory 16, persistent data storage 18, communications unit 20, and input/output (I/O) unit 22. Communications fabric 12 may include a dedicated system bus, a general system bus, multiple buses arranged in hierarchical form, any other type of bus, bus network, switch fabric, or other interconnection technology. Communications fabric 12 supports transfer of data, commands, and other information between various subsystems of computing device 10.

Processor unit 14 may be a programmable central processing unit (CPU) configured for executing programmed instructions stored in memory 16. In another illustrative example, processor unit 14 may be implemented using one or more heterogeneous processor systems in which a main processor is present with secondary processors on a single chip. In yet another illustrative example, processor unit 14 may be a symmetric multi-processor system containing multiple processors of the same type. Processor unit 14 may be a reduced instruction set computing (RISC) microprocessor such as a PowerPC® processor or IBM z System from IBM® Corporation, an x86 compatible processor such as a Pentium® processor from Intel® Corporation, an Athlon® processor from Advanced Micro Devices® Corporation, or any other suitable processor. In various examples, processor unit 14 may include a multi-core processor, such as a dual core or quad core processor, for example. Processor unit 14 may include multiple processing chips on one die, and/or multiple dies on one package or substrate, for example. Processor unit 14 may also include one or more levels of integrated cache memory, for example. In various examples, processor unit 14 may comprise one or more CPUs distributed across one or more locations.

Data storage 26 includes memory 16 and persistent data storage 18, which are in communication with processor unit 14 through communications fabric 12. Memory 16 can include a random access semiconductor memory (RAM) for storing application data, i.e., computer program data, for processing. While memory 16 is depicted conceptually as a single monolithic entity, in various examples, memory 16 may be arranged in a hierarchy of caches and in other memory devices, in a single physical location, or distributed across a plurality of physical systems in various forms. While memory 16 is depicted physically separated from processor unit 14 and other elements of computing device 10, memory 16 may refer equivalently to any intermediate or cache memory at any location throughout computing device 10, including cache memory proximate to or integrated with processor unit 14 or individual cores of processor unit 14.

Persistent data storage 18 may include one or more hard disc drives, solid state drives, flash drives, rewritable optical disc drives, magnetic tape drives, or any combination of these or other data storage media. Persistent data storage 18 may store computer-executable instructions or computer-readable program code for an operating system, application files comprising program code, data structures or data files, and any other type of data. These computer-executable instructions may be loaded from persistent data storage 18 into memory 16 to be read and executed by processor unit 14 or other processors. Data storage device 26 may also include any other hardware elements capable of storing information, such as, for example and without limitation, data, program code in functional form, and/or other suitable information, either on a temporary basis and/or a permanent basis.

Persistent data storage 18 and memory 16 are examples of physical, tangible, non-transitory computer-readable data storage devices. Data storage device 26 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 14 may also be suitably programmed to read, load, and execute computer-executable instructions or computer-readable program code for data analysis software 38, as described in greater detail below. In one example approach, as shown in FIG. 1, program code 34 includes data analysis software 36 for implementing a data analysis tool 38 on a computing device such as computing device 10. The program code may be stored in memory 16, persistent data storage 18, or elsewhere in computing device 10. This program code may also take the form of program code 34 stored on computer-readable medium 32 as part of computer program product 30, and may be transferred or communicated, through any of a variety of local or remote means, from computer program product 30 to computing device 10 to be enabled to be executed by processor unit 14, as further explained below.

The operating system for computing device 10 may provide functions such as device interface management, memory management, and multiple task management. The operating system may be a Unix based operating system such as the AIX® operating system or Linux on z Systems operating system from IBM® Corporation, a non-Unix based operating system such as the Windows® family of operating systems from Microsoft® Corporation, a network operating system such as Javas® from Oracle® Corporation, or any other suitable operating system. Processor unit 14 may be suitably programmed to read, load, and execute instructions of the operating system.

Communications unit 20, in this example, provides for communications with other computing or communications systems or devices. Communications unit 20 may provide communications through the use of physical and/or wireless communications links. Communications unit 20 may include a network interface card for interfacing with a LAN 16, an Ethernet adapter, a Token Ring adapter, a modem for connecting to a transmission system such as a telephone line, or any other type of communication interface. Communications unit 20 can be used for operationally connecting many types of peripheral computing devices to computing device 10, such as printers, bus adapters, and other computers. Communications unit 20 may be implemented as an expansion card or be built into a motherboard, for example.

The input/output unit 22 can support devices suited for input and output of data with other devices that may be connected to computing device 10, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 22 may also include any type of interface for video output in any type of video output protocol and any type of monitor or other video display technology, in various examples. It will be understood that some of these examples may overlap with each other, or with example components of communications unit 20 or data storage device 26. Input/output unit 22 may also include appropriate device drivers for any type of external device, or such device drivers may reside elsewhere on computing device 10 as appropriate.

Computing device 10 also includes a display adapter 24 in this illustrative example, which provides one or more connections for one or more display devices, such as display device 28, which may include any of a variety of types of display devices. It will be understood that some of these examples may overlap with example components of communications unit 20 or input/output unit 22. Input/output unit 22 may also include appropriate device drivers for any type of external device, or such device drivers may reside elsewhere on computing device 80 as appropriate. Display adapter 24 may include one or more video cards, one or more graphics processing units (GPUs), one or more video-capable connection ports, or any other type of data connector capable of communicating video data, in various examples. Display device 28 may be any kind of video display device, such as a monitor, a television, or a projector, in various examples.

Input/output unit 22 may include a drive, socket, or outlet for receiving computer program product 30, which comprises a computer-readable medium 32 having computer program code 34 stored thereon. For example, computer program product 30 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 32 may include any type of optical, magnetic, or other physical medium that physically encodes program code 34 as a binary series of different physical states in each unit of memory that, when read by computing device 10, induces a physical signal that is read by processor 14 that corresponds to the physical states of the basic data storage elements of storage medium 32, and that induces corresponding changes in the physical state of processor unit 14. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 14, thereby physically causing or configuring processor unit 14 to generate physical outputs that correspond to the computer-executable instructions, in a way that causes computing device 10 to physically assume new capabilities that it did not have until its physical state was changed by loading the executable instructions comprised in program code 34.

In some illustrative examples, program code 34 may be downloaded over a network to data storage 26 from another device or computer system for use within computing device 10. Program code 34 comprising computer-executable instructions may be communicated or transferred to computing device 10 from computer-readable medium 32 through a hard-line or wireless communications link to communications unit 20 and/or through a connection to input/output unit 22. A computer-readable medium 32 comprising program code 34 may, in some examples, be located at a separate or remote location from computing device 10, and may be located anywhere, including at any remote geographical location anywhere in the world, and may relay program code 34 to computing device 10 over any type of one or more communication links, such as the Internet and/or other packet data networks. The program code 34 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 34 may be transmitted from a source computer-readable medium 32 over non-tangible media, such as communications links or wireless transmissions containing the program code 34. Program code 34 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 10.

Figure 2:
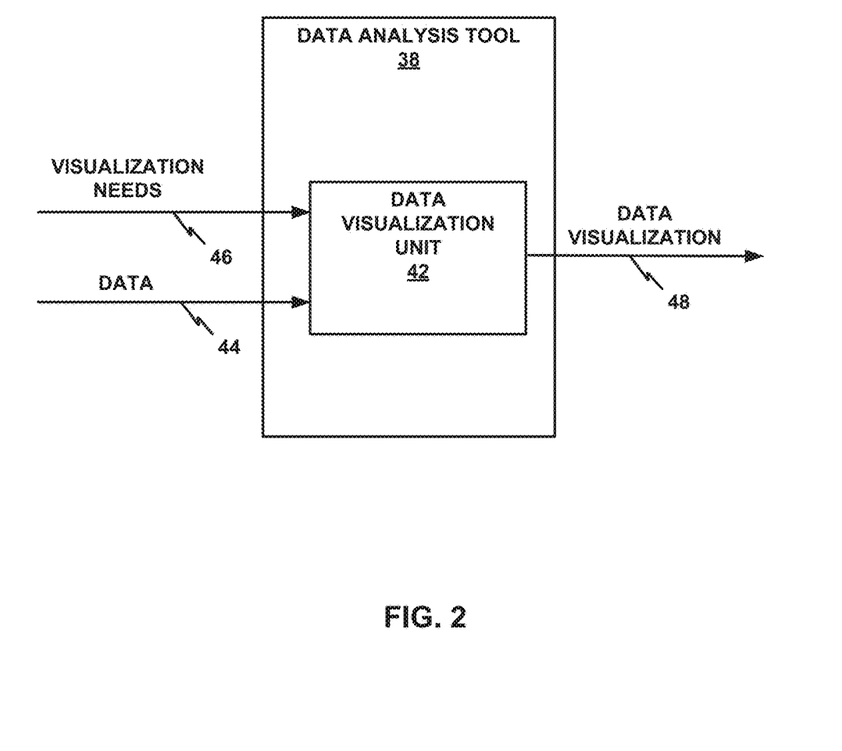
FIG. 2 illustrates an example data analysis tool, according to one aspect of this disclosure.

FIG. 2 illustrates an example data analysis tool 38, according to one aspect of the disclosure. In the example shown in FIG. 2, data analysis tool 38 includes a data visualization unit 42 which accepts two pieces of input from the user: a set 44 of data and a specification 46 describing the user's data visualization intent, and provides a data visualization 48 for data set 44.

Figure 3:
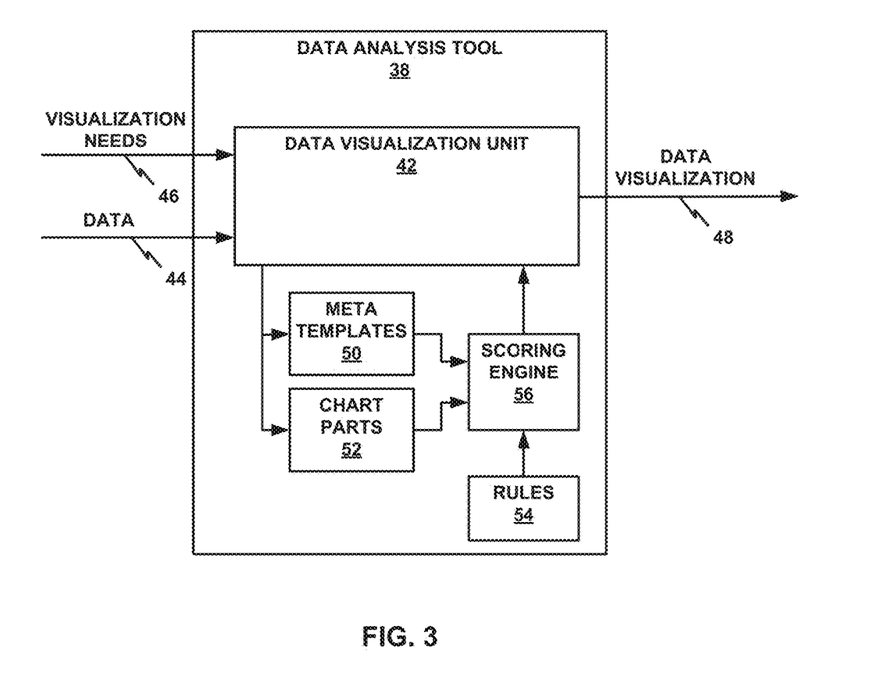
FIG. 3 illustrates another example data analysis tool, according to one aspect of the disclosure.

FIG. 3 illustrates another example data analysis tool 38, according to one aspect of the disclosure. In the example shown in FIG. 3, data analysis tool 38 includes a data visualization unit 42 which accepts two pieces of input from the user: a set 44 of data and a specification 46 describing the user's data visualization intent, and provides a data visualization 48 for data set 44 based on a ranking of the fitness of available data visualization mechanisms by scoring engine 56. In one example approach, scoring engine 56 provides a data visualization recommendation based on available Meta templates 50, available chart parts 52 and a validation and scoring rules database 54. In one example approach, scoring engine 56 provides a list of possible data visualization recommendations ranked by fitness score to data visualization unit 42 and data visualization unit 42 selects an appropriate data visualization based on the fitness scores.

Figure 4:
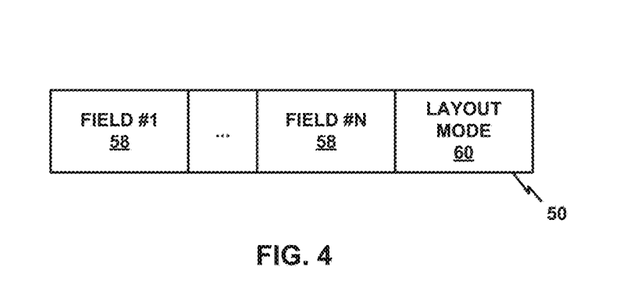
FIG. 4 illustrates a Meta template, according to one aspect of the disclosure.

FIG. 4 illustrates a Meta template, according to one aspect of the disclosure. In one example approach, each Meta template 50 includes a set of fields 58 and a layout mode 60. Each field 58 is defined as taking up a part of the layout, such as a vertical axis, or a projected item. As a result, these templates 50 do not define a complete visualization, but rather a number of data fields that fit the layout mode it describes. Fields in Meta templates 50 may also be used to describe how to layout basic Meta templates 50, to allow for a composite dashboard of charts that allow for even more fields and even more complex problems to be solved. Some examples of Meta templates 50 include, for example, continuous vs discrete Cartesian (optionally with a legend), continuous vs continuous Cartesian, and continuous vs discrete polar.

In one example approach, each Meta template 50 defines the common information for a visualization that ties parts of the visualization together (for example, the coordinate system), and the types of parts that need to be filled in to create a visualization. In one such example approach, a Meta template 50 describing a horizontal discrete axis, a vertical continuous axis, and a discrete legend or series, based on a Cartesian coordinate system, defines one possible approach to displaying the data of FIG. 7A (as demonstrated in the visualization displayed in FIG. 7B, below).

In one example approach, chart parts 52 is a separate knowledge base used to contain the set of chart parts that can be used in combination with the Meta templates to produce wholly defined chart templates. Each of these chart parts defines the type of data it can be applied to (e.g., continuous vs non-continuous), and a set of scoring rules that define how well they can be adapted to the data they are applied to. The chart parts also contain a set of restrictions defining the slots in each Meta template 50 to which the chart parts can be applied. In some example approaches, representative chart parts include Bar axis, Numeric axis, stacked legend, clustered legend, and Bubble or point legend. In this context, the slots represent the elements in the meta-template 50 that have to be filled in with applicable chart parts. For example, system 8 may place a standard categorical axis with labels into the horizontal slot in a particular Meta template 50.

In one example approach, rules database 54 includes a set of validation and scoring rules that score and validate combinations of chart parts, for solving a particular problem. In one such approach, they are applied to a chosen set of chart parts and applied data, and the user's intent, to generate a fitness score. In one such example approach, a validation rule is triggered to ensure, for example, that only a temporal data field can be assigned to that axis, and a scoring rule might put a preference on a particular granularity like Years rather than Days.

In one example approach, a scoring engine 56 receives information on each viable combination of Meta template and chart part received based on the data and the user's data visualization intent, generates a fitness score for each combination and ranks the combinations as a function of the fitness scores.

Figure 5:
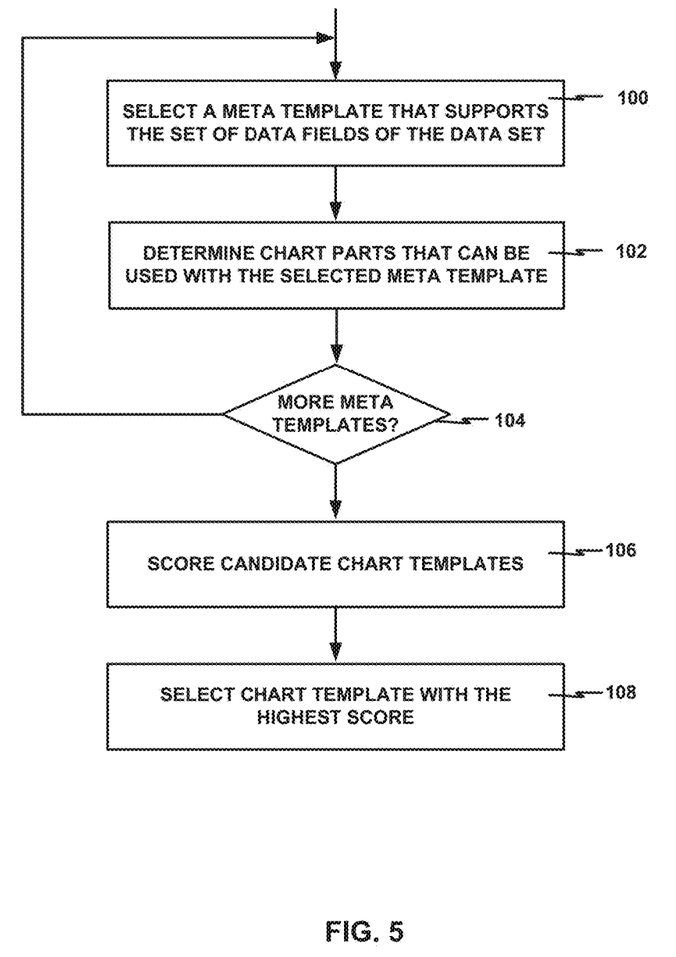
FIG. 5 depicts a flowchart of an example process that a data visualization recommendation tool, executing on one or more computing devices (e.g., servers, computers, processors, etc.), may perform, in one aspect of this disclosure.

FIG. 5 depicts a flowchart of an example process that a data visualization recommendation tool, executing on one or more computing devices (e.g., servers, computers, processors, etc.), may perform, in one aspect of this disclosure. In one example approach, as shown in FIG. 5, system 8 selects a Meta template that supports the set of data fields of the data set being examined (100). System 8 then determines chart parts that can be used in the selected Meta template (102). System 8 checks to determine if there are any remaining Meta templates (104) and, if so, returns to 100.

If, however, system 8 determines chart parts that there are no remaining Meta templates to be examined (104), control moves to 106 and system 8 scores candidate chart templates (106) and selects the chart template with the highest score (108).

In one example approach, for each applicable Meta template, system 8 selects viable Meta templates and then enumerates the set of chart parts that can be used within the selected Meta templates, and that are applicable to the type and shape of the data the user provided. In the example given above, where data is express as three fields ("Years", "Products", and "Revenue"], where we want to compare products and revenue ({"type": "compare", fields: ["Products", "Revenue"]}) and where we want to see any trends in revenue over the years ({"type": "trend", fields: ["Years", "Revenue"]}), there are many choices for the horizontal and legend axes. The horizontal (discrete) axis could be showing lines, bars, points and so on. A standard vertical continuous axis may be the only choice in this example. The legend axis may be clustered or stacked.

Lastly, as noted above, system 8 scores the variations according to the set of combination rules to find the best choice(s) for the user's intent specification. For example, in the above example the chart parts used to display Years and Revenue may be scored relative to the trend intent, and the parts used to show revenue and products may be scored relative to the comparison intent. Since the data is temporal, applying Years to the horizontal discrete axis, and taking the line option may score highest. For the legend, applying products and choosing the clustered option for comparison may be the best choice since the user did not specify in the intent definition that they wanted to see a summarization of the data.

One of the benefits of system 8 is that new definitions for entire charts need not be added to the system. Any new chart parts may simply be defined in terms of the Meta templates and data they are applicable to, as well as their scoring rules, after which they can then be recommended in new chart combinations as appropriate. As such, the number of potential charts available for recommendation may be much larger, and may be applied to composite user intents as supported by the intent spec provided by the user.

Figure 6:
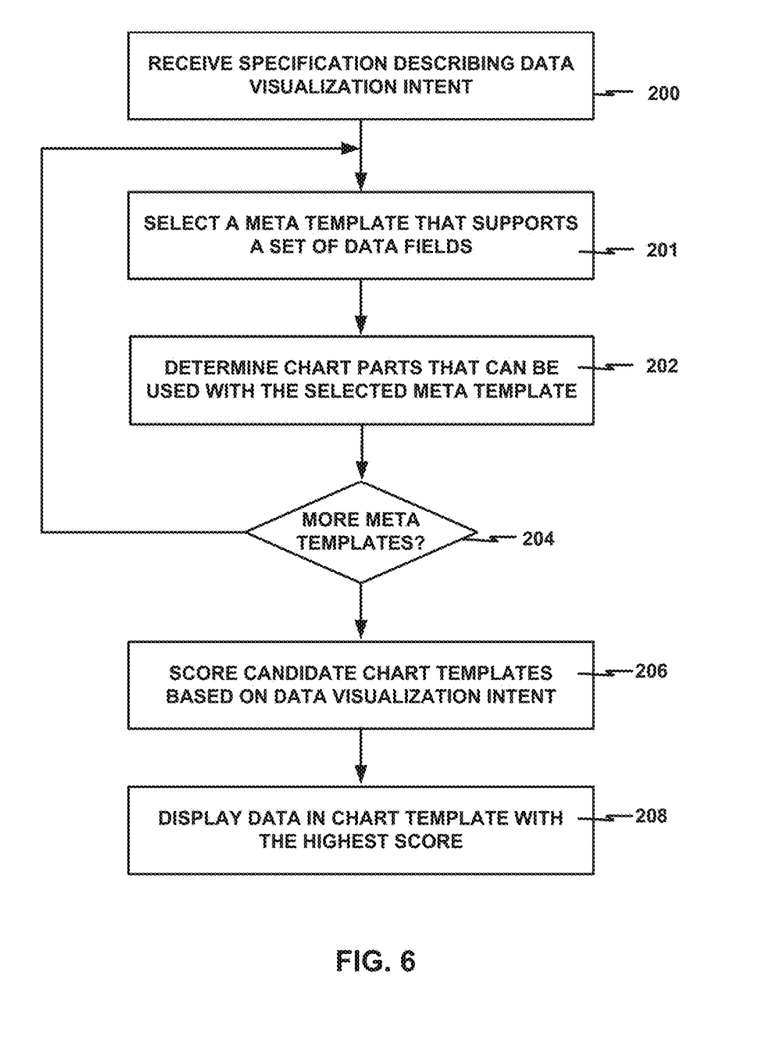
FIG. 6 depicts a flowchart of another example process that a data visualization recommendation tool, executing on one or more computing devices (e.g., servers, computers, processors, etc.), may perform, in one aspect of this disclosure.

FIG. 6 depicts a flowchart of another example process that a data visualization recommendation tool, executing on one or more computing devices (e.g., servers, computers, processors, etc.), may perform, in one aspect of this disclosure. In one example approach, as shown in FIG. 6, system 8 receives a specification describing data visualization intent for a particular data set (200) and selects a Meta template that supports the set of data fields of the data set being examined (201). System 8 then determines chart parts that can be used in the selected Meta template (202). System 8 checks to determine if there are any remaining Meta templates (204) and, if so, returns to 201.

If, however, system 8 determines chart parts that there are no remaining Meta templates to be examined (204), control moves to 206 and system 8 scores candidate chart templates (206) based on the data visualization intent specification and displays the data in the data set using the chart template with the highest score (208).

Figure 7A:
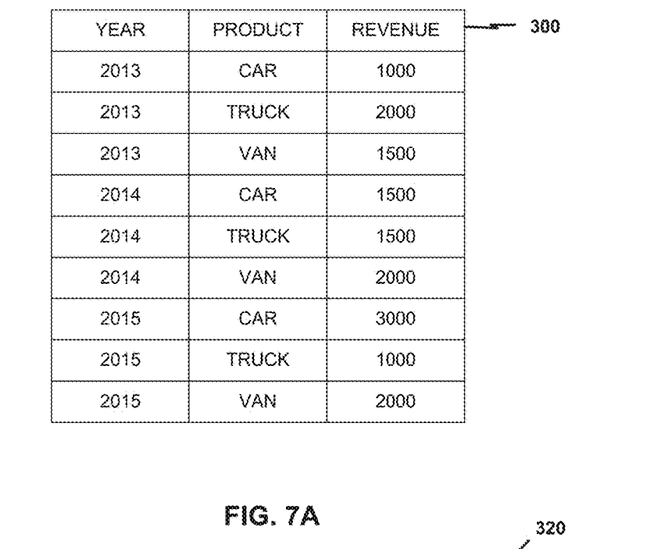
FIG. 7A illustrates an example data set, according to one aspect of this disclosure.

FIG. 7A illustrates an example data set, according to one aspect of this disclosure. In example data set 300 of FIG. 7A, data is presented in columns by year, product and the amount of revenue per product per year. A user may want to ask a question such as "How do my products compare by revenue, over my years?" From this question the user may develop a data visualization intent specification such as the following:

```
[{
    intent: "comparison",
    dataItems: ["Product","Revenue"]
},{
    intent: "trend",
    dataItems: ["Year","Revenue"]
}]
```

This intent specification describes that the user wants to compare the revenue for their products, but also see how their revenue changes over the years in the dataset. System 8 may then (for each part of the intent specification), look up the chart parts available in its library and identify the parts that both support the intent, and can support the dataItems listed. As noted above, each Meta template 50 defines the common information for a visualization that ties parts of the visualization together (for example, the coordinate system), and the types of parts that need to be filled in to create a visualization. In one example, system 8 may find the following two chart parts for the two parts of the intent specification respectively:

1. A Horizontal Line, against a vertical metric axis, and a categorical X-Axis.

2. A Categorical legend for comparison against a metric axis.

These two parts can satisfy a Meta-chart type that contains a Categorical X-Axis and metric Y-Axis, and a legend. Meta templates 50 that include one or more of these chart parts are candidates for the visualization. System 8 may select as one candidate a Meta template 50 describing a horizontal discrete axis, a vertical continuous axis, and a discrete legend or series, based on a Cartesian coordinate system. System 8 may also select a Meta template 50 describing a simple column chart as another possible candidate for the visualization of the data of FIG. 7A. System 8 weighs each candidate based on, for example, a scoring system to select the best visualization for the selected data set.

In one example approach, the scoring system is a rule based system where the overall score is simply the combination (usually addition) of the scores of each rule that was satisfied for each artifact. In the example above, a simple column chart may score lower than a line chart since bars do not satisfy the time data as well as lines do.

Figure 7B:
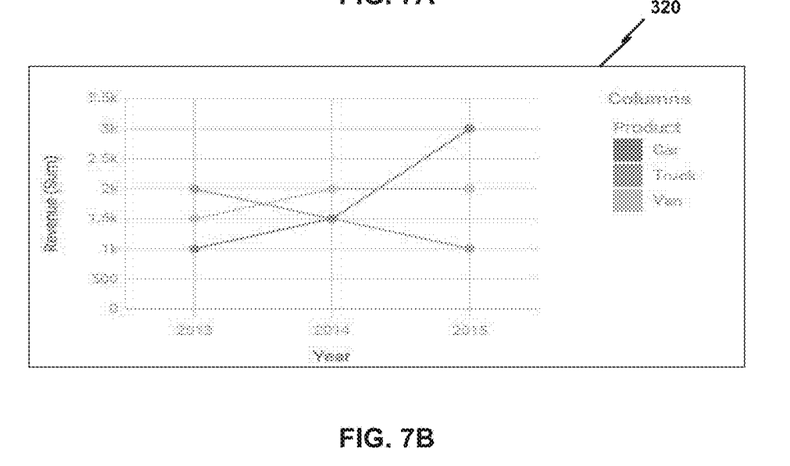
FIG. 7B illustrates the recommended data visualization as applied to the dataset of FIG. 7A.

FIG. 7B illustrates the recommended data visualization as applied to dataset 300 of FIG. 7A. In the example approach of FIG. 7B, the Meta template 50 selected has, within the horizontal slot of the template, a standard categorical axis with labels (here, "year"). In one such example approach, system 8 may apply a validation rule that is triggered to ensure, for example, that only a temporal data field can be assigned to the horizontal axis, and a scoring rule might put a preference on a particular granularity, such as "Years" over "Days." Chart 320 in FIG. 7B therefore allows the user to compare the revenue of their products, and see how they change over their years. Chart 320 therefore answers the question "How do my products compare by revenue, over my years?"

Figure 8A:
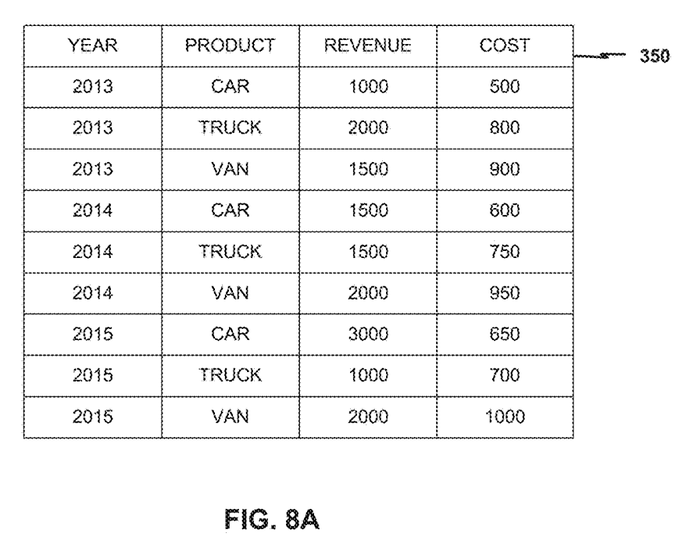
FIG. 8A illustrates another example data set, according to one aspect of this disclosure.

FIG. 8A illustrates another example data set, according to one aspect of this disclosure. In the example dataset 350 of FIG. 8A, a cost metric has been added to dataset 300. If the user wants to ask the question "How does my revenue and cost relate for my products, over years," the question may be expressed as an intent-based specification. One possible interpretation is that the user wants to accomplish five different things:

```
[{
    intent: "correlation",
    dataItems: ["Cost","Revenue"]
},
```

```
{
    intent: "compare",
    dataItems: ["Product","Revenue"]
},
{
    intent: "compare",
    dataItems: ["Product","Cost"]
},
{
    intent: "trend",
    dataItems: ["Year","Revenue"]
},{
    intent: "trend",
    dataItems: ["Year","Cost"]
}]
```

System 8 may then look-up in its library and find the parts in chart parts 52 that match (like above). It may find respectively:
1. A scatter plot of points against two metric axes (X and Y axes)
2. A Categorical legend for comparison against a metric axis.
3. A Categorical legend for comparison against a metric axis.
4. A Horizontal Line, against a vertical metric axis, and a categorical X-Axis.
5. A Horizontal Line, against a vertical metric axis, and a categorical X-Axis.

System 8 then looks up the minimal number of Meta-charts (the candidate chart templates of FIGS. 5 and 6)) that can satisfy these parts. It may find two Meta-charts are required to satisfy all these intents. Two example charts meeting these requirements are shown in FIGS. 8B and 8C.

Figure 8B:
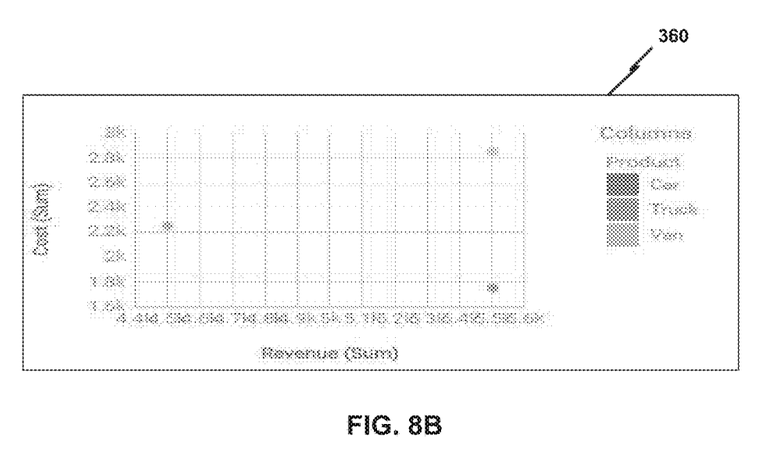
FIGS. 8B and 8C illustrate a recommended combination of data visualizations for the dataset of FIG. 8A, according to one aspect of the disclosure.
Figure 8C:
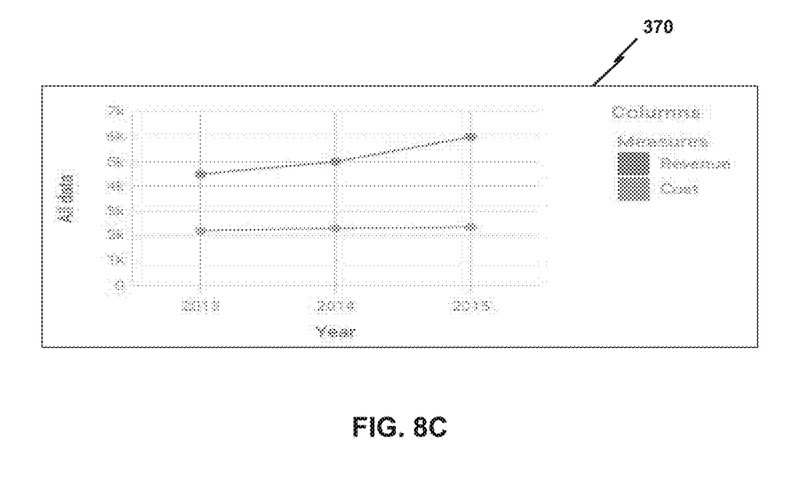

FIGS. 8B and 8C illustrate a recommended combination of data visualizations for the dataset of FIG. 8A, according to one aspect of the disclosure. FIGS. 8B and 8C illustrate the recommended data visualization as applied to dataset 350 of FIG. 8A. Chart 360 in FIG. 8B allows the user to compare the revenue of each product to its cost over a three year period. Chart 370 in FIG. 8C allows the user to compare the revenue of all their products against the cost of the same products, and see how the relationship changes over the years 2013-2015.

This effectively creates a multi part dashboard or report that can answer the user's question. The first chart (chart 360) satisfies the first three sections of the intent specification (correlation and both comparisons). The first chart uses the legend for both comparisons since both required measure axes exist in the scatter plot. The second chart (chart 370) satisfies the other two sections of the intent specification by plotting two lines on the same chart, and automatically adding in a legend to differentiate the two (this is an example of a Meta-chart). Together, the two charts provide visualizations that answer the question, "How does my revenue and cost relate for my products, over the years?"

In some example approaches, system 8 may score chart parts 52 based on how relevant they are for the intents chosen. In some such approaches, system 8 may retrieve more than one chart part for each part of the specification. If this is the case, system 8 may, in some approaches, select the chart part with the highest score. In other approaches, system 8 may select the chart part that, in combination with the other chart parts, allows for the smallest number of charts based on how they can be combined within meta-charts. In yet other approaches, system 8 simply enumerates all possible combinations of chart parts and satisfied meta-charts to present the user with choices that all apply to the intent specification given. In one example approach, system 8 selects a minimal set of charts satisfying all the criteria of the intent specification. Such an approach is generally more effective. Such an approach, however, is only one scoring rule, and others could be applied instead, such as having the set of visualizations that each contain the fewest fields, so that each of the visualizations in the set is simpler in nature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
identifying, via a user interface, a dataset having two or more data fields;
defining, via the user interface, a data visualization intent specification for the dataset, the data visualization intent specification including one or more data visualization intent specification entries, each data visualization intent specification entry including an intent type and data field identifiers identifying a set of two of more data fields selected from the data fields of the dataset, wherein each data visualization intent specification entry defines, via the intent type, a desired type of data analysis in a data visualization of data from the set of two or more data fields identified in the data visualization intent specification entry, the desired type of data analysis selected from a group of data analysis types including a compare type and trend type;
selecting, with one or more processing devices, based on the intent type of the data visualization intent specification entry, Meta templates that meet the intent type of the data visualization intent specification entry and that support the set of two or more data fields;
determining, with the one or more processing devices and for each selected Meta template, chart parts to be assigned to each of the selected Meta templates, the combination of each selected Meta template with the chart parts assigned to that selected Meta template forming a chart template associated with that selected Meta template; and
selecting, with the one or more processing devices and based on a set of combination rules and on the data visualization intent specification, one or more of the chart templates associated with the selected Meta templates.

2. The method of claim 1, wherein each Meta template includes a plurality of template fields and a layout mode, wherein the plurality of template fields includes a plurality of chart part type fields, wherein each of the chart parts includes restrictions limiting the chart parts to certain chart part type fields and wherein the layout mode defines how the chart parts associated with the chart part type fields are laid out in a data visualization corresponding to the selected Meta template.

3. The method of claim 2, wherein the layout mode defines, for each template field, a relationship between the template field and a layout model.

4. The method of claim 1, wherein one or more of the Meta templates is a complex Meta template, wherein each complex Meta template includes one or more Meta templates and a layout mode defining positioning of the included one or more Meta templates.

5. The method of claim 4, wherein the complex Meta templates define combinations of two or more charts associated with the data set.

6. The method of claim 1, wherein one or more of the Meta templates is a complex Meta template, wherein each complex Meta template includes one or more template fields, one or more Meta templates and a layout mode defining positioning of the included one or more template fields and the included one or more Meta templates.

7. The method of claim 1, wherein determining chart parts that can be used with the selected Meta templates includes defining a knowledge base of chart parts that can be used with the Meta templates to produce defined chart templates.

8. The method of claim 7, wherein each chart part includes a definition of types of data to which it can be applied.

9. The method of claim 8, wherein each chart part includes limitations on the Meta templates with which the chart part can be used.

10. The method of claim 1, wherein the set of combination rules includes validation and scoring rules that score and validate combinations of chart parts used to solve a particular problem.

11. The method of claim 1, wherein the set of combination rules includes validation and scoring rules that score and validate combinations of chart parts used to solve a particular problem and wherein selecting chart templates includes generating a fitness score based on the selected chart parts and the set of scoring rules.

12. The method of claim 1, wherein determining chart parts that can be used with the selected Meta templates includes defining a knowledge base of chart parts that can be used with each of the Meta templates to produce chart templates,
wherein the set of combination rules includes validation and scoring rules that score and validate combinations of chart parts used to solve a particular problem, and
wherein selecting chart templates includes generating a fitness score based on the selected chart parts and the set of scoring rules.

13. A computer program product comprising a computer-readable storage medium having program code embodied therewith, the program code executable by a computing device to:
identify, via a user interface, a dataset having two or more data fields;
define, via the user interface, a data visualization intent specification for the dataset, the data visualization intent specification including one or more data visualization intent specification entries, each data visualization intent specification entry including an intent type and data field identifiers identifying a set of two of more data fields selected from the data fields of the dataset, wherein each data visualization intent specification entry defines, via the intent type, a desired type of data analysis in a data visualization of data from the set of two or more data fields identified in the data visualization intent specification entry, the desired type of data analysis selected from a group of data analysis types including a compare type and trend type;
select, based on the intent type of the data visualization intent specification entry, Meta templates that meet the intent type of the data visualization intent specification entry and that support the set of two or more data fields;
determine, for each selected Meta template, chart parts to be assigned to each of the selected Meta templates, the combination of each selected Meta template with the chart parts assigned to that selected Meta template forming a chart template associated with that selected Meta template; and
select, based on a set of combination rules and the data visualization intent specification, one or more of the chart templates associated with the selected Meta templates.

14. The computer program product of claim 13, wherein each Meta template includes a a plurality of template fields and a layout mode, wherein the plurality of template fields includes a plurality of chart part type fields, wherein each chart part includes restrictions limiting the chart parts to certain chart part type fields, and wherein the layout mode defines, for each template field, a relationship between the template field and a layout model.

15. The computer program product of claim 13, wherein one or more of the Meta templates is a complex Meta template, wherein each complex Meta template includes one or more Meta templates and a layout mode defining positioning of the included one or more Meta templates and wherein the complex Meta templates define combinations of two or more charts associated with the data set.

16. The computer program product of claim 13, wherein the program code for determining chart parts includes program code executable by a computing device to:
retrieve chart part information for selected chart parts from a knowledge base of chart parts, wherein the chart part information includes a definition of types of data to which the chart part can be applied and the Meta templates with which the chart part can be used; and
identify candidate chart templates based on the selected Meta templates and their associated chart parts.

17. The computer program product of claim 13, wherein the program code for determining chart parts includes program code executable by a computing device to:
define a knowledge base of chart parts that can be used with each of the Meta templates to produce chart templates,
wherein the set of combination rules includes validation and scoring rules that score and validate combinations of chart parts used to solve a particular problem, and
wherein the program code for selecting chart templates includes program code executable by a computing device to generate a fitness score based on the selected chart parts and the set of scoring rules and to display data from the data set in the chart template associated with the highest fitness score.

18. A computer system comprising:
one or more processors, one or more computer-readable memories, and one or more computer-readable storage mediums;
program instructions, stored on at least one of the one or more storage mediums for execution by at least one of the one or more processors via at least one of the one or more memories, to identify, via a user interface, a dataset having two or more data fields;
program instructions, stored on at least one of the one or more storage mediums for execution by at least one of the one or more processors via at least one of the one or more memories, to define, via the user interface, a data visualization intent specification for the dataset, the data visualization intent specification including one or more data visualization intent specification entries, each data visualization intent specification entry including an intent type and data field identifiers identifying a set of two of more data fields selected from the data fields of the dataset, wherein each data visualization intent specification entry defines, via the intent type, a desired type of data analysis in a data visualization of data from the set of two or more data fields identified in the data visualization intent specification entry, the desired type of data analysis selected from a group of data analysis types including a compare type and trend type;
program instructions, stored on at least one of the one or more storage mediums for execution by at least one of the one or more processors via at least one of the one or more memories, to select, based on the intent type of the data visualization intent specification entry, Meta templates that meet the intent type of the data visualization intent specification entry and that support the set of two or more data fields;

program instructions, stored on at least one of the one or more storage mediums for execution by at least one of the one or more processors via at least one of the one or more memories, to determine, for each selected Meta template, chart parts to be assigned to each of the selected Meta templates, the combination of each selected Meta template with the chart parts assigned to that selected Meta template forming a chart template associated with that selected Meta template; and program instructions, stored on at least one of the one or more storage mediums for execution by at least one of the one or more processors via at least one of the one or more memories, to select, based on a set of combination rules and the data visualization intent specification, one or more of the chart templates associated with the selected Meta templates.

19. The computer system of claim 18, wherein the program instructions for determining chart parts includes:

program instructions to retrieve chart part information for selected chart parts from a knowledge base of chart parts, wherein the chart part information includes a definition of types of data to which the chart part can be applied and the Meta templates with which the chart part can be used; and program instructions to identify candidate chart templates based on the selected Meta templates and their associated chart parts.

20. The computer system of claim 18, wherein the set of combination rules includes validation and scoring rules that score and validate combinations of chart parts used to solve a particular problem, wherein the program instructions for determining chart parts include program instructions to define a knowledge base of chart parts that can be used with each of the Meta templates to produce chart templates, and wherein the program instructions for selecting chart templates includes:

program instructions to generate a fitness score based on the selected chart parts and the set of scoring rules; and program instructions to display data from the data set in the chart template associated with the highest fitness score.

* * * * *